United States Patent Office 2,960,607
Patented Nov. 15, 1960

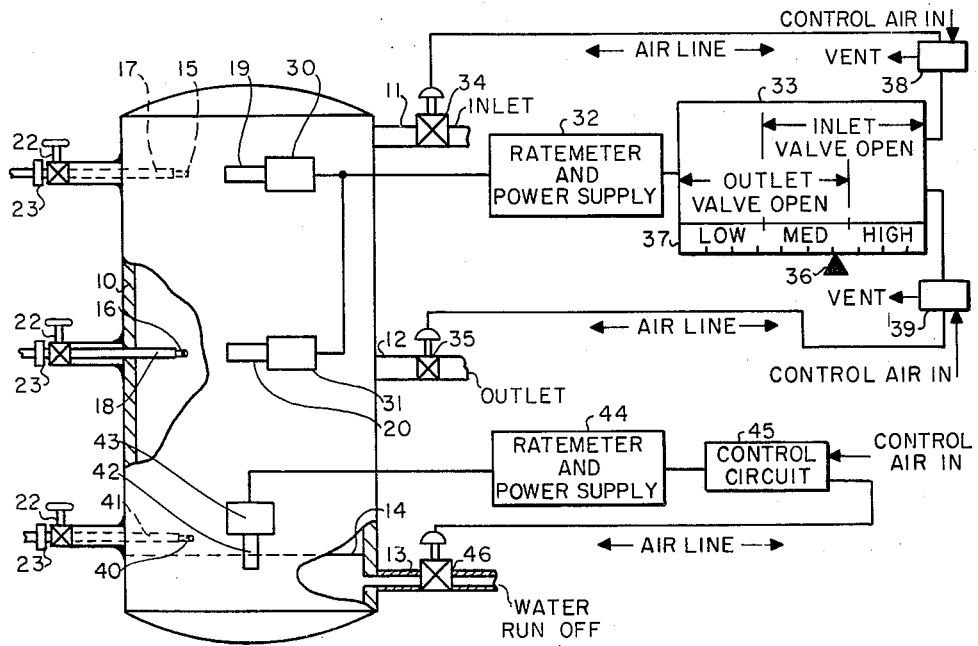
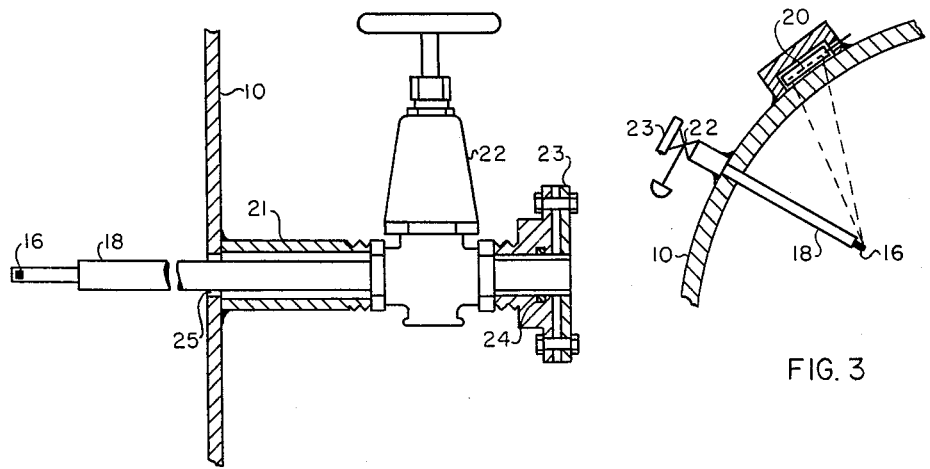
FIG. 1
FIG. 2
FIG. 3
INVENTOR
JEROME KOHL

2,960,607
LEVEL CONTROL APPARATUS

Jerome Kohl, Berkeley, Calif., assignor to Tracerlab, Inc., Boston, Mass., a corporation of Massachusetts Filed Sept. 8, 1954, Ser. No. 454,672

5 Claims. (Cl. 250—43.5)

This invention relates to the automatic maintenance of the level of material flowing through a vessel within predetermined upper and lower limits. In the handling of petroleum products, for example crude oil, it is necessary to pass the oil through a settling tank to effect the removal of water from the crude, the crude as it is received from the well being introduced near the top of the vessel and the oil with the water removed being drawn from the vessel through an outlet disposed below the inlet but above the bottom of the tank. The water is withdrawn from an outlet located at or near the bottom of the tank. To permit unattended operation of the settling tank, it is desirable automatically to open and close the inlet and outlet, as flow rates vary, so as to maintain the level within the range between the outlet and the inlet.

It is well known to use various forms of level determining devices such as gauge glasses wherein the level is determined by visual observation, or floats which are carried by the material to indicate the level. In general, devices of this type are unreliable, and require the attendance of an operator to manipulate the valves as dictated by the indicated level.

It is also well known to utilize a source of penetrative radiation in conjunction with a counter, such as a Geiger counter, to determine the level of liquid in a vessel. A number of arrangements of source and detector have been employed, the usual configuration comprising a source and counter both positioned exteriorly of the vessel, diametrically opposite from each other, which are moved simultaneously in a vertical direction to locate the liquid level when a large number of radiations are picked up by the counter after the level of the liquid has been passed by the radiation source. This arrangement requires a high intensity source to permit detection of the radiation after twice penetrating the wall of the vessel and the full diameter of the vessel; the large source, in turn, requires shielding to protect operating personnel.

Another known arrangement utilizes a source positioned within the vessel and a counter mounted exteriorly of the vessel and vertically off-set from the source, thus producing a gradually diminishing counter response as the liquid passes the source and approaches the detector. Installation of the source within the vessel heretofore was made when the process was shut down, since entry into the vessel was necessary. In certain applications, however, when the processing vessel did not permit access, or in cases where shutting down of the process is desirably avoided, if at all possible, internal location of the source was impossible, and the more easily installed external source was resorted to.

The present invention is directed to the utilization of penetrative radiation sources in conjunction with radiation counters and associated control equipment automatically to maintain the level of material in a vessel within a predetermined range. More specifically, in connection with a settling tank having an upper inlet and a lower outlet, a pair of sources of radiation are supported within the vessel, one positioned slightly below the inlet and the other slightly above the outlet, to cooperate with a pair of counters located exteriorly of the vessel in the planes of the two sources. Various known sources of radiation may be employed in carrying out the invention, a gamma-emitting material of long half-life, such as radium or cobalt-60 being satisfactory. The intensity of the radiation being diminished by the passage through matter, when the level is below the lower source and detector, both counters receive a maximum of radiation; when the level is intermediate the two sources, the output of the lower detector is diminished; and when the level is above the upper detector, the outputs of both counters are a minimum. In accordance with the invention, the counters are connected in parallel to a single counting rate meter whereby the output of the latter varies in amplitude between three discrete values, namely, a "high" value where both sources are exposed, a "medium" value where only the upper source is exposed, and a "low" value where there is material surrounding both sources. The inlet and outlet are each provided with normally open remotely controlled valves, and a control circuit of suitable characteristics is operable to close the inlet when the output of the counting rate meter is "low" and to close the outlet when the output is "high," whereby the level is automatically maintained within the range between the inlet and outlet ports.

To provide wholly unattended operation of the settling tank, a third source a detector combination is utilized to give continuous control of water run-off, maintaining the oil-water interface below the level of the outlet. The source is supported within the vessel below the outlet and above the water run-off line, and a third counter, preferably of elongated configuration, is mounted exteriorly of the vessel with its longitudinal axis disposed vertically, to span the vertical distance between the source and the run-off line. Inasmuch as the water will absorb a larger fraction of the radiation passing through a unit length than the less dense oil, the counting rate of the detector varies with changes in interface level over the detector length. The output of the detector is fed to a count rate meter, the output of which is utilized to control a valve in the run-off line.

Another feature of the invention is the method of installing the sources within the tank while the tank is in service. This is accomplished by operating a cutting tool through a packing gland and gate valve to cut openings in the wall, and thereafter inserting a rod on the inner end of which is mounted the radioactive source. This design permits the installation or removal of the source with the tank in operation. Another important advantage of the design is that it permits predetermination of the distance from the source to the detector without regard to tank diameter, which permits accurate determination of the source size and the use of the same size source on different diameter tanks.

Other features and advantages of the invention will be apparent from the following detailed description of a preferred embodiment, taken in conjunction with the accompanying drawings in which:

Fig. 1 is an elevation view of a settling tank, and illustrating a control circuit in block diagram form;

Fig. 2 is a fragmentary view, partially in section, illustrating the manner in which the sources are installed; and Fig. 3 is a fragmentary horizontal section taken along line 3—3 of Fig. 1 illustrating the position of the source relative to the counter.

Referring to Fig. 1, 10 indicates a vessel having an inlet 11 at its top through which crude oil or other material is introduced, and an outlet 12 located a considerable distance below the inlet for drawing material from the vessel. When the vessel is used as a settling tank for crude oil, the water settles to the bottom and is drawn off through water run-off line 13 at a rate to maintain the water-crude oil interface 14 at a level above the run-off line and below outlet 12. Supported within vessel 10 in horizontal planes slightly below inlet 11 and slightly above outlet 12 are respectively positioned sources 15 and 16 of penetrative radiation, for example, radium. The sources are respectively mounted on the inner ends of cylindrical rods 17 and 18, which project radially inward through the wall of vessel 10, in a manner to be more fully described in connection with Fig. 2. Exteriorly of vessel 10, in the planes of sources 15 and 16, and circumferentially spaced from the points of entry of rods 17 and 18, are respectively mounted radiation detectors or counters 19 and 20. The sources are preferably spaced of the order of one foot from the wall of the vessel, and the detectors displaced therefrom a distance such that the source is about two feet from the center of its respective detector, as will more clearly be seen in Fig. 3. This relatively short distance between source and detector permits the use of low intensity sources; in the example given, one millicurie of radium for each of sources 15 and 16 is satisfactory.

As was noted earlier, the sources may be installed while the tank is in service, this being accomplished in a manner illustrated in Fig. 2. To the wall of vessel 10 at the proper height is welded a nipple 21, to which is attached a gate valve 22. A packing gland 23 having a gasket 24, for example, an O-ring, is threaded to the outer end of valve 22, the inner diameter of the O-ring being of a diameter to provide a sealing fit between a drill or the rod 18. With valve 22 open, a cutting drill is inserted through the packing gland and valve, and an opening 25 is cut in the wall of the vessel, the O-ring seal around the cutting tool preventing discharge of oil. The tool is then partially removed, and valve 22 closed, to permit complete removal. The source supporting rod 18, having the source 16 encapsulated at its inner end, is inserted through packing gland 23, valve 22 is opened, and the rod inserted the proper distance, the rod 18 being of a length to permit some adjustment in the spacing of the source 16 from the wall of the vessel. It will be apparent that this construction permits installation and/or removal of the sources while the vessel is in service.

Returning now to Fig. 1, the outputs of counters 19 and 20 are amplified by preamplifiers 30 and 31 respectively, and applied in parallel to a remotely located counting ratemeter 32. The power supply for detectors 19 and 20 and their respective preamplifiers is also located remotely from the vessel and may be physically combined with the ratemeter circuit. The ratemeter may be of conventional design, and produces a unidirectional signal proportional in amplitude to the rate at which pulses are received. Thus, if the level of the liquid is below source 16, both of detectors 19 and 20 will be exposed to its respective source, and the combined counting rate will be a maximum, hereafter referred to, and in the claims, as of "high" value. When the level rises to a position intermediate sources 15 and 16, the material between source 16 and detector 20 absorbs essentially all of the radiation from source 16, with the result that the combined output is cut substantially in half, causing a "medium" value output from ratemeter 32. As the material rises above source 15, the number of radiations received by detector 19 is similarly substantially reduced, resulting in a ratemeter output signal of "low" value.

The output signal from ratemeter 32 is fed to a control circuit 33 arranged to be responsive to the foregoing distinct counting rates to operate values 34 and 35 in the inlet and outlet, respectively. Control circuit 33 may take a variety of forms, and, for purpose of illustration, may comprise a Minneapolis-Honeywell indicating potentiometer of the type described on pages 8, 10 and 16 of Minneapolis-Honeywell's 1952 catalog No. 15—15. The instrument is diagrammatically illustrated as having an indicator 36 which moves across scale 37 in response to changes in amplitude of the unidirectional signal from the ratemeter, which in the present application are limited to three distinct values, "low," "medium," and "high." Indicating potentiometer 33 includes a pair of relays which may be adjusted to pick up in response to a signal of predetermined value and to drop out at another value. These relays are respectively arranged to operate two 3-port solenoid valves respectively associated with inlet valve 34 and outlet valve 35, and diagrammatically illustrated at 38 and 39. Control air is introduced through one port, one port vents the air to atmosphere, and the third port supplies air to the air-operated valve. When the signal from counting ratemeter 32 is of "medium" value, both relays are arranged to actuate its respective solenoid valve causing air pressure to hold both the inlet valve 34 and outlet valve 35 in the open position. If the level then rises above source 15, the resulting "low" counting rate trips the relay associated with solenoid 38, causing the solenoid to be de-energized and venting the control air to atmosphere, closing inlet valve 34. When the level drops below source 16, the resulting "high" counting rate causes de-energization of solenoid 39, venting the control air to the atmosphere and closing outlet valve 35. The system is arranged such that either electrical or air failure will cause both inlet and outlet valves to close. From the foregoing, it is seen that the disclosed system is operative, without attendance, to maintain the level of the material within the range between inlet 11 and outlet 12.

While the disclosed air-operated system is particularly advantageous where there is danger of explosion, it will of course be understood that motor-controlled valves, in turn under the control of the aforementioned relays, may be used without departing from the spirit of the invention.

Continuous control of water run-off is provided by a third source 40, supported on rod 41, similarly to sources 15 and 16, and counter 42 circumferentially spaced from the point of entry of rod 41. As distinguished from detectors 19 and 20, counter 42 is disposed in a vertical position, with its lower extremity slightly above water run-off line 13 and its upper extremity in the plane of source 40. Inasmuch as there is always material present between source 41 and detector 42, source 40 is necessarily of higher intensity than sources 15 and 16, two millicuries of radium being satisfactory. The vertical disposition of counter 42 gives a change in counting rate as a function of the level of interface 14 over the detector length. The output of detector 42 is amplified in the preamplifier 43 and coupled to counting ratemeter 44. The output of the ratemeter is fed to control circuit 45 which is operative to control the position of valve 46 so as to be inversely proportional to the count rate; e.g., as the count rate rises due to the interface falling, run-off valve 46 will tend to close, and vice versa. Thus, the run-off is automatically and continuously controlled, preventing discharge of oil through outlet 13 and maintaining the interface below outlet 12.

While there have been shown and described and pointed out novel features of the invention as applied to a preferred embodiment, it will be understood that various omissions and substitutions and changes in form may be made by those skilled in the art without departing from the spirit of the invention. It is applicant's intention therefore, to be limited only as indicated by the scope of the appended claims.

What is claimed is:

1. Apparatus for maintaining the level of material passing continuously through a vessel between a normally open upper inlet and a normally open lower outlet which comprises first and second sources of penetrative radiation supported within said vessel in spaced relation to the vessel wall in horizontal planes slightly below said inlet and slightly above said outlet, respectively, first and second counters positioned exteriorly of said vessel in the planes of said first and second sources, respectively, in spaced relation to its respective source, a counting rate meter connected to said counters for producing a signal proportional in amplitude to the sum of the radiations received by said first and second counters, said signal being of "high" amplitude when the level falls below the plane of said second counter, of "medium" amplitude when the level is intermediate the planes of said first and second counters and of "low" amplitude when the level is above the plane of said first counter, remotely controllable valves for said inlet and outlet, and a control circuit connected to said counting rate meter and including first and second relays arranged to actuate said inlet and outlet valves respectively, said first relay being operative to close said inlet valve when said signal is of "low" amplitude and to open said inlet valve when said signal is of "medium" or "high" amplitude, and said second relay being operative to open said outlet valve when said signal is of "low" or "medium" amplitude and to close said outlet when said signal is of "high" amplitude.

2. Apparatus for maintaining the level of material passing continuously through a cylindrical vessel between a normally open upper inlet and a normally open lower outlet which comprises first and second sources of penetrative radiation supported on the inner ends of rods each projecting a relatively short distance into the vessel in horizontal planes slightly below said inlet and slightly above said outlet, respectively, first and second counters positioned exteriorly of the vessel in the plane of said first and second sources, respectively, and a relatively short distance circumferentially around the vessel from the point of entry of said rods whereby a small amount of material separates each source and its respective counter as the level reaches the respective planes thereof, a counting rate meter connected to said counters for producing a signal proportional in amplitude to the sum of the radiations received by said first and second counters, and a control circuit connected to said counting rate meter operative in response to said signal to close said outlet when the level falls below the plane of said second counter and to close said inlet when the level rises above the plane of said first counter.

3. Apparatus for maintaining the level of material passing continuously through a cylindrical vessel between an upper inlet and a lower outlet which comprises first and second sources of penetrative radiation adjustably supported within said vessel on the inner ends of rods projecting radially through openings in a wall of the vessel in horizontal planes slightly below said inlet and slightly above said outlet, respectively, first and second counters positioned exteriorly of the vessel at a relatively short circumferential distance from said openings and in the planes of said first and second sources, respectively, for receiving radiation principally from its respective source, a counting rate meter connected to said first and second counters for continuously providing an electrical signal of an amplitude proportional to the sum of the radiations received by said first and second counters, remotely controlled valves for said inlet and said outlet, a control circuit connected to said counting rate meter and including first and second relays operative in response to said signal and arranged to actuate said inlet and outlet valves, respectively, said first relay being operative to close said inlet valve when said material intercepts radiation from both sources and otherwise to maintain said inlet valve open, and said second relay being operative to close said outlet valve when said material intercepts radiation from neither source and otherwise to maintain said outlet valve open.

4. Apparatus for separating first and second constituents of an input mixture comprising a vessel having an upper inlet, and lower and intermediate outlets, first, second and third sources of penetrative radiation located in fixed relationship to the vessel wall in horizontal planes slightly below said inlet, slightly above said intermediate outlet, and slightly above said lower outlet, respectively, first and second counters respectively positioned in the planes of said first and second sources for receiving radiations principally from its respective source, a counting rate meter positioned exteriorly of said vessel for producing a signal having an amplitude proportional to the sum of the radiations received by said first and second counters, means for introducing said mixture into said vessel through said upper inlet whereby said first and second constituents are gravitationally separated to form an interface, a third counter disposed substantially in the plane of said third source and above the plane of said lower outlet for receiving radiation from said third source, control means operative in response to said signal from said counting rate meter to close said intermediate outlet when the level of said mixture falls below the plane of said second source and to close said inlet when the level of said mixture rises above the plane of said first source, and control means operative from said third counter for closing said lower outlet when the level of said interface falls below said third source and counter, whereby said interface continuously remains substantially between said intermediate and lower outlets and said mixture level in said vessel continuously remains below said upper inlet.

5. Apparatus for separating first and second constituents of an input mixture comprising a vessel having an upper inlet, and lower and intermediate outlets, first, second and third sources of penetrative radiation located in fixed relationship to the vessel wall in horizontal planes slightly below said inlet, slightly above said intermediate outlet, and slightly above said lower outlet, respectively, first and second counters respectively positioned in the planes of said first and second sources for receiving radiations principally from its respective source, means for producing a signal proportional to the sum of the radiations received by said first and second counters, means for introducing said mixture into said vessel through said upper inlet whereby said first and second constituents are gravitationally separated to form an interface, a third counter disposed substantially in the plane of said third source and above the plane of said lower outlet for receiving radiation from said third source, control means operative in response to said signal from said signal producing means to close said intermediate outlet when the level of said mixture falls below the plane of said second source and to close said inlet when the level of said mixture rises above the plane of said first source, and control means operative from said third counter for closing said lower outlet when the level of said interface falls below said third source and counter, whereby said interface continuously remains substantially between said intermediate and lower outlets and said mixture level in said vessel continuously remains below said upper inlet.

References Cited in the file of this patent

UNITED STATES PATENTS

| | | |
|---|---|---|
| 2,662,985 | Good | Dec. 15, 1953 |
| 2,674,695 | Grace | Apr. 6, 1954 |
| 2,734,136 | Atchison | Feb. 7, 1956 |